United States Patent [19]
Salina et al.

[11] Patent Number: 4,562,858
[45] Date of Patent: Jan. 7, 1986

[54] PROGRAMMABLE STEPPER FOR TRANSDUCER CONTROLLED APPARATUS

[75] Inventors: Louis E. Salina; Joseph E. Lescovich, both of Bridgeville, Pa.

[73] Assignee: GA Industries Inc., Mars, Pa.

[21] Appl. No.: 479,161

[22] Filed: Mar. 28, 1983

[51] Int. Cl.$^4$ .................. F17D 3/01; F16K 31/02
[52] U.S. Cl. ...................... 137/392; 417/36; 307/118; 361/178
[58] Field of Search ............. 137/2, 392; 73/304 R, 73/304 C; 417/36, 44; 307/118; 361/178

[56] References Cited

U.S. PATENT DOCUMENTS

| | | | |
|---|---|---|---|
| 2,953,147 | 9/1960 | Hornback | 137/2 |
| 3,420,263 | 1/1969 | Ohlsson | 137/392 |
| 4,111,218 | 9/1978 | Hobbs | 137/2 |
| 4,265,263 | 5/1981 | Hobbs | 137/2 |
| 4,386,623 | 6/1983 | Funk et al. | 137/2 |

*Primary Examiner*—G. L. Walton
*Attorney, Agent, or Firm*—Parmelee, Miller, Welsh & Kratz

[57] ABSTRACT

A stepper for use between a transducer subjected to variable pressure, heat or liquid level for converting the continuous output signal of the transducer with all of its variations, both of significant magnitude and those of insignificant importance, into a continuous stepped output signal that increases or decreases the current to a transducer responsive control unit, particularly a servo amplifier, which stepped signal eliminates all minor and unimportant fluctuations from the output current from the transducer. The stepper also includes a sequence of voltage regulators such as potentiometers in the circuits between the stepper and the servo amplifier by means of which the magnitude of the current flow of each step to the servo amplifier may be adjusted or programmed with respect to one another. It is particularly useful in the regulation of flow control valves in water distribution and sewage disposal systems, but its application to steam boilers is also disclosed and described.

24 Claims, 9 Drawing Figures

PROGRAMMABLE STEPPER FOR TRANSDUCER CONTROLLED APPARATUS

BACKGROUND OF THE INVENTION

This invention is for a transducer responsive control system which is interposed between a transducer and the apparatus which the transducer monitors and controls. A transducer as herein referred to is an instrument which responds to the variations in liquid level, pressure, or temperature in an apparatus wherein liquid level, pressure or heat are converted into a continuous electric current that fluctuates either directly or inversely with the changes in liquid level or pressure within a selected range in the monitored apparatus. In most apparatus to which the transducer responds, a signal reflecting minor and relatively insignificant variations in liquid level or pressure is generated causing quite frequent and often almost constant changes and reversals up or down in the throttling of a supply valve or the operation of a motor, etc., resulting in frequent service calls and earlier replacement than should be necessary.

The present invention is for a system or apparatus whereby the output signal from the transducer is converted, without interruption to the continuity of the signal current from the transducer, into a series of steps of preferably, but not necessarily, equal magnitude at predetermined stages, whether arrived at cumulatively by a succession of minor variations in the same direction or by a continuous rise or fall from one stage to another in the parameters to which the transducer responds, but eliminating minor or unimportant fluctuations between stages.

Since the present invention was initially conceived for use in connection with the control, or throttling of a supply valve to a water storage tower in a municipal or like water supply system, it may be easily followed by reference to this use where it has special application. In such application the transducer signal is reflected in the throttling or adjustment of a valve in steps or stages between fully open and fully closed positions with provision also for programming the degree of opening or closing of the valve at each step or stage to compensate for the fact that a 10° opening of a valve, for instance from fully closed to the 10° open position, may effect a much greater increase in volume of flow than, for example, the same extent of opening between 70° to 80° of opening.

In municipal and like water distribution systems, it is quite common to have a water tower of a height of perhaps 40 meters from which water is distributed through mains and individual service lines to the residents, businesses, shops, etc. in the community. The demands for water change from hour to hour, day to day, and season to season. The supply of water to the tower to meet these demands is provided by a supply main through an electrically controlled throttling valve which is responsive to the rise and fall in the level of water in the tank.

Assuming a tank is 40 meters high, the maximum depth of water would be 39 meters in order to leave an air space of one meter. This being the case, the supply valve must be closed when the 39 meter depth is reached. It may be assumed in this system that as the water level drops from this maximum level to 32 meters or below, the valve will be fully open. Ideally, the inflow through the supply valve and the outflow from the tank should maintain the level of water in the tank as close as possible to some intermediate level as established by the demand then existing.

Heretofore, a transducer resonding to the level of water in the tank as the water level varied to any measurable extent, up or down, throttled the supply valve to effect an opening or closing of the supply valve through a servo amplifier which signaled the degree of valve opening as the water level in the tank decreased, until the supply valve ultimately might reach a fully open condition when the water level dropped to the 32 meter level or below. Conversely, if the demand for water from the tower decreases and the level then rises, the valve will progressively close, reaching a fully closed position at the 39-meter level.

Since the water level in the tower is practically never static but is continuously rising or falling, the transducer transmits a correspondingly continuously fluctuating signal to the servo amplifier which, in turn, continuously commands the valve to adjust one way or another. This results in frequent demands for servicing and shortens the useful life of the equipment.

Moreover, with the present system the valve opens or closes as though each degree of opening resulted in an increase or decrease in flow, as did any other degree where, as pointed out above, one degree of change when the valve is nearly closed affects the flow to a greater or lesser extent than one degree of change as the valve approaches a fully open position. That is, the presently used apparatus assumes a linear increase in variation whereas, in fact, the flow through the valve as it opens or closes must be graphically represented as a curve, dropping away steeply from the closed position and then curving laterally near the full open position. The successive energizing of these relays or their successive de-energizing transmits an impulse to the servo amplifier to increase or decrease, as the case may be, the degree of opening or closing of the throttling or supply valve.

With the present invention this variable transducer signal is not transmitted to the servo amplifier but is transmitted instead to a unit between the transducer and servo amplifier that produces from the frequently varying transducer signal a stepped signal in which each step is of predetermined magnitude, up or down, and variations in the transducer signal that occur between steps are never transmitted to the servo amplifier. Each signal to the servo amplifier, up or down, will be ordinarily but not necessarily for a step of equal height to every other step, typically one meter below a selected height, except at the top and bottom of the range where the valve is fully closed at the top of the range and is fully open at the bottom.

However, since the change in rate of flow through a valve will not vary equally with each degree of valve opening or closing, a rate of flow with the valve open 20% from a fully closed position may differ substantially from the rate of flow with a change in 20% opening or closing with the valve already 50% or 60% or 70% open. This invention further provides a programmable opening or closing of the valve to different degrees at different levels where the magnitude of the steps, i.e. for example one meter, will be equal at each step but the degree to which the valve is opened or closed may be adjusted so that the rate of flow of water at each level may be equalized to that at the others, or otherwise programmed, perhaps to give a greater rate of flow in the intermediate levels to keep closer pace with the demand. If the level of the water falls below the lowermost level of the scale at 32 meters in the assumed example, the supply valve will remain at the fully open position at the bottom of the scale. For simplicity of explanation we assume herein steps of equal magnitude; but as will be readily understood by those skilled in the art, this is not necessarily the case. For example, where ice formation conditions may be a problem, the steps may be unequal but the circuitry, in principal, will not change.

The stepping sequence is controlled by a comparator which energizes or de-energizes a succession of relays which transmit a stepped signal to a servo amplifier that commands the opening or closing of the supply valve, the extent or degree of opening or closing of the valve being regulated by a potentiometer or equivalent signal magnitude adjusting means between each of the respective relay generated signals to the servo amplifier, as hereinafter described in detail.

Important to the operation of the invention, no signal may be transmitted to any relay to increase the opening of the valve until the previous relay in the series has been first energized and no relay, therefore, can operate out of sequence. When a closing sequence of the valve is directed, which means deenergizing the relays in succession, no relay can be de-energized until the preceding relay has been first de-energized. This assumes that no opening or closing of the valve can take place at any time but only in steps from at least one stage to the next. We refer to this part of the apparatus as the "stepper".

Finally, the inclusion of a light emitting diode (LED) in each relay circuit gives a visual indication of that relay circuit which, at the time it is lighted, gives an approximate indication of the liquid level in the tank. If it is full, one LED is lighted; if the valve is full open, another LED is lighted, and the intervening diodes in this seqence indicate the level to which water is being supplied. A two-color red and green LED is desirably included in the system to indicate whether at any particular time the system is responding to a rising or falling level in the storage tank.

BRIEF DESCRIPTION OF THE DRAWINGS The foregoing brief description is to explain the purpose of the invention and give some general indication of the nature of the circuitry, but the full description of the invention and its operation may only be followed by reference to the accompanying drawings, in which:

FIG. 4 is a schematic illustration of the entire programmable valve positioner circuit. The paired brackets indicate that the upper and lower sections between brackets constitute a single relay unit. Because of the small scale of the drawing, few reference characters are included in this figure.

FIGS. 5 and 6 are complementary sections of FIG. 4 on a larger scale to provide for the inclusion of reference letters and characters of legible size, FIG. 5 being the lower section up to and including part only of the double pole-double throw (D.P.D.T.) relays. FIG. 6 shows the respective complementary circuits to FIG. 5 for the remainder of each relay and the entire relay output circuit.

DETAILED DESCRIPTION OF THE DRAWINGS

Figure 1:
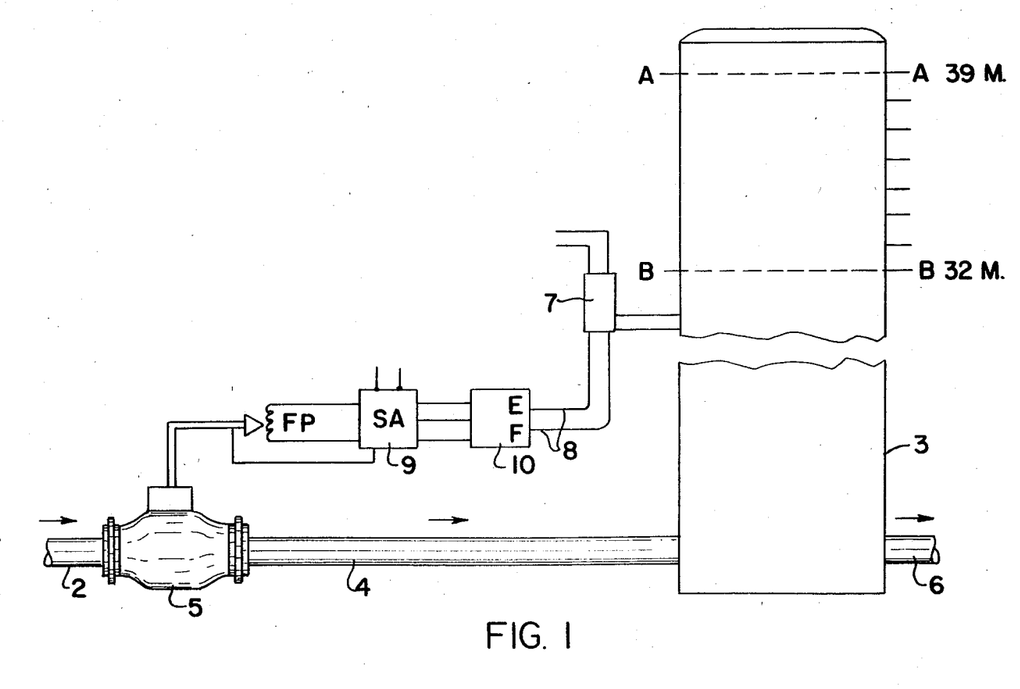
FIG. 1 is illustrative of the application of the invention, herein referred to generally as a programmable valve positioner, to a water tower and its supply valve.

In FIG. 1 there is disclosed schematically an overall illustration of an embodiment of the invention comprising a water tower with a transducer, a supply main, a throttling valve, a servo amplifier directing the operation of the valve and the programmable valve positioner. In this arrangement there is indicated a water supply main 1, a water tower or tank 3, and a pipe 4 through which water is conducted to tank 3 from a valve 5 between 2 and 4. The outlet from the tower through which water is supplied to the surrounding community is indicated at 6. There is commonly located on the tower a transducer 7 that responds to the rise and fall of water level in the upper portion of the tower and which produces from a current supply voltage of constant value a variable output current of increasing or decreasing voltage, respective to the increase or decrease of water level in the tank, or inversely with respect thereto; that is, the voltage may decrease as the level in the tank rises instead of increasing, but the magnitude of the change either way will be the same. While we shall describe a positive selection between the increase in voltage with an increase in depth, this invention is equally applicable to an inverse decrease or increase in this respect, and the description and claims are to be interpreted as equivalent. Heretofore this variable current has been transmitted through wires 8 directly to a servo amplifier 9 that signals the operation of the throttle valve, also hereinafter referred to as the "supply valve," to increase the flow of water to the tower as the water level falls and to slow its flow as the water level in the tower increases, effecting the closing of the valve completely at an upper level below the top of the tower, thereby assuring at all times an air space in the tower above the water level. Typically, the rise and fall of the output current or signal from the transducer span an unbroken range of from four to twenty milliamperes.

The present invention provides a programmable valve positioner 10 in the circuit 8 between the transducer and the servo amplifier that converts the almost continuous rising and falling signal output from the transducer into a succession of steps or stages spaced at equal or preselected intervals in the rise and fall of the water level in the tank, such that, for example, a command to the valve will be transmitted only with a rise or fall of one meter in the level of water in the limited upper portion of the tank to which the transducer responds. When the water is at the highest level and the throttle valve has been completely closed, the valve may then open only after a predetermined drop in the level of water—in this case, a drop of one meter. This drop will effect a restricted opening of the valve while at and below another level several meters below the upper limit the valve may be fully open. A one-meter rise in level above such lower level will initiate the step by step control as the liquid level in the tank increases. Any change in level at any intermediate stage between the two positions will require a change of level of at least two meters, one up or one down, before initiating a valve change signal, bearing in mind, of course, that at the uppermost level in the tank only a decrease in the level of one stage can effect any opening of the valve and at the bottom of the scale any further decrease in tank level is ineffective to effect any change from a full open position of the supply valve.

It will, of course, be understood that a one-meter unit is illustrative of a practical measure but larger or smaller fixed increments and variation of increments in the scale may be easily provided for.

In the system illustrated and herein specifically described, the tower 3 is assumed to be 40 meters in height, the maximum water level is at 39 meters, leaving at all times at least one meter of air space above the highest level of water. This upper limit is indicated in FIG. 1 of the drawing by broken line A—A. Broken line B—B is at the 32-meter level. At and below line B—B the water supply valve to the tower is fully open. Between broken line A—A and B—B there are, in this illustration, seven intermediate levels one meter apart; and when the water is at any one of these intermediate levels, the valve positioner will allow a full change of levels to take place, one meter below or one meter above, before any command will be transmitted to the supply valve to increase or decrease the rate of flow from the main into the tower.

The transducer 7 is per se a well-known unit and the present invention involves no change in its construction or operation. Simply explained, the rise or fall in water level in the tank results in an increase or decrease, respectively, in pressure. This change of pressure is converted, as before mentioned, into the movement of an electrical contact along the resistance unit of a potentiometer, giving rise to an increase in output voltage with an increase in water pressure in the tower and a decrease in output voltage with a lowering of water level in the tower. Conventionally, it need respond only to a change in water level in the uppermost portion of the tower to prevent water from rising above the 39 meter level and the 32 meter lower level, because when the level falls to 32 meters or lower, the valve must be fully open to catch up to the outflow and bring the level back up to this upper depth range in the tank.

Figure 2:
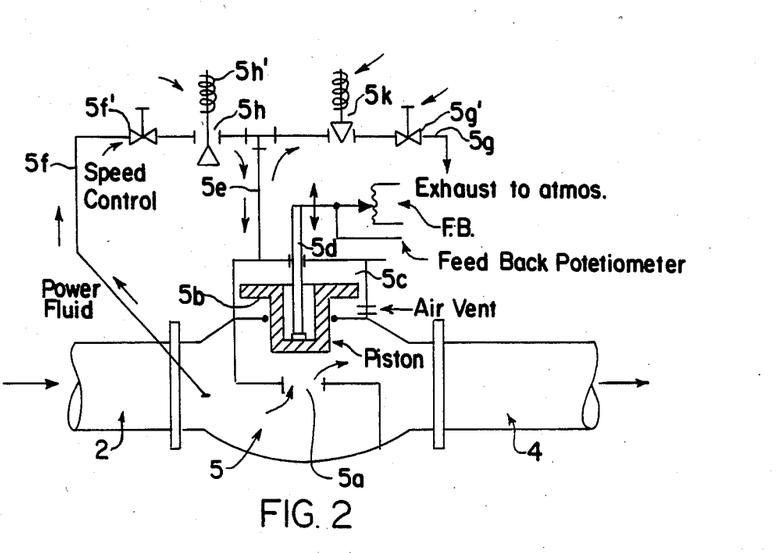
FIG. 2 is a schematic view of a widely known and used flow control valve, herein usually referred to as the supply valve, which is included by way of example to illustrate a throttling valve to the control of which the invention is applicable.

The supply valve or throttle valve 3 is also a standard unit which is used as at present, without change per se in its structure, but for a full understanding of the present invention has been schematically illustrated in FIG. 2.

In FIG. 2, the supply main 2 is connected to the inlet of the valve 5, and 4 is the inlet connection from the valve to the tank. The valve has a port 5a through which water (or other liquid if the system is used in the storage of liquid other than water) flows from the main to the inlet connection. The valve seat surrounds this port and a piston-type valve element 5b, moving toward and away from the port, controls or throttles the flow through the port. The upper area of valve element 5b is larger than the lower area and this larger area is confined within a cylinder 5c. The valve piston 5b has an extension 5d projecting through a gland on the upper enclosure for the cylinder which transmits motion to a feedback potentiometer (FP). A fluid pressure line 5e connects the cylinder with two branching lines 5f and 5g. Line 5f opens into the valve body at the inlet side of the port and has a manually adjustable flow control valve 5f' to regulate the closing speed of the valve. There is also an electrically operated flow control valve indicated at 5h, which is normally open (N/O) as diagrammed. It may be spring biased to remain open for transmitting the line pressure from the inlet side of the valve to the cylinder whereby the full pressure of liquid at the inlet side of the valve will operate to normally hold the throttle valve closed because of the larger upper area of the valve piston as compared with its lower surface of the piston within the body of the valve itself. The branch line 5g opens to atmosphere and has a manually adjustable valve 5g' which, like valve 5f', manually adjusts to control the rate of flow through the respective branch. Branch 5g also includes an electrically operated valve 5k which is a normally closed (N/C) valve. Through coordinated operation of valves 5k and 5h, pressure in the valve cylinder 5c may be regulated between full line pressure at the inlet side and atmospheric pressure to hold the valve fully open. As heretofore indicated, the almost continuously measurable variations in tank pressure through the transducer causes the N/O and N/C valve to almost continously adjust and correspondingly unnecessarily vary the flow rate.

Figure 4:
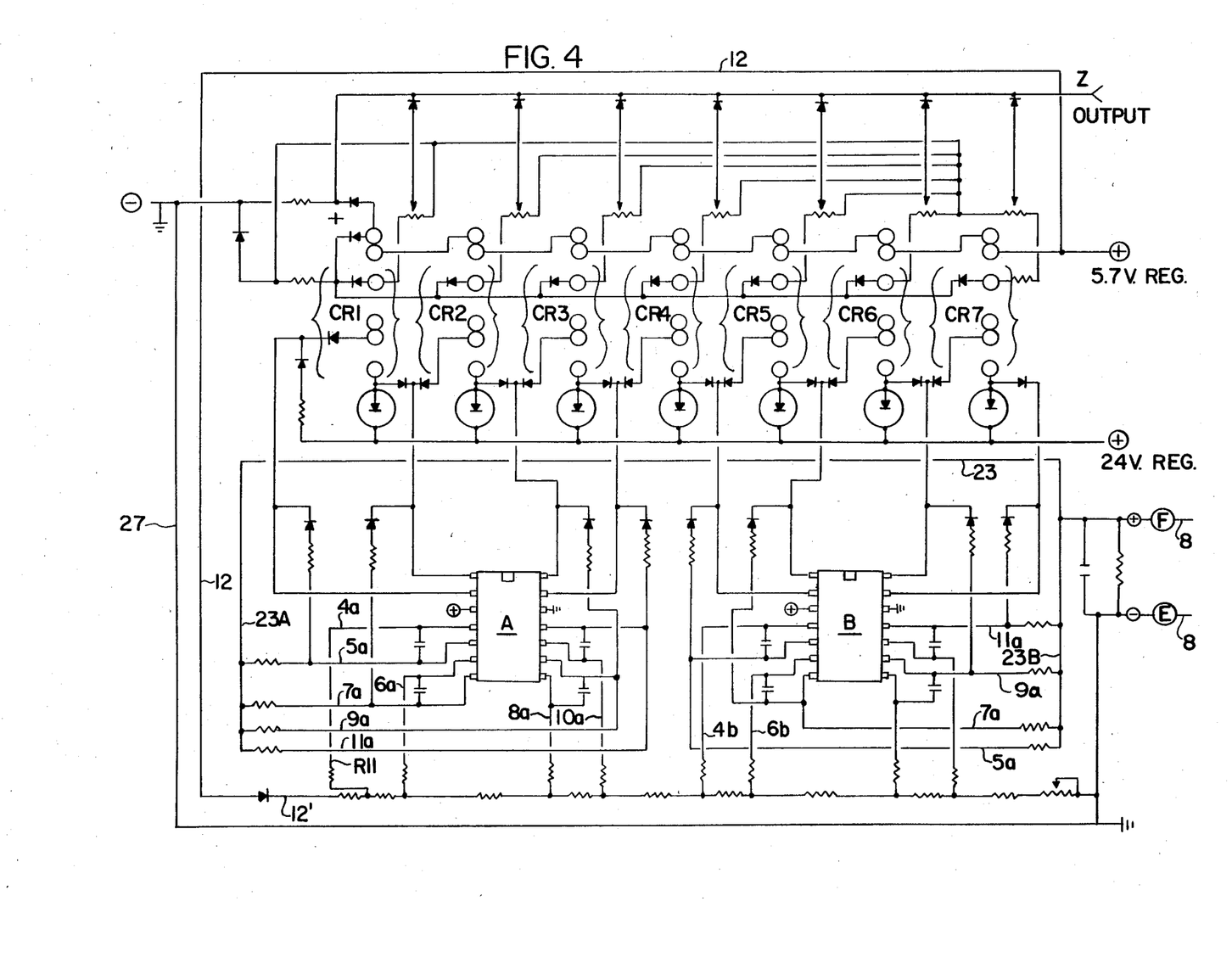
Figure 5:
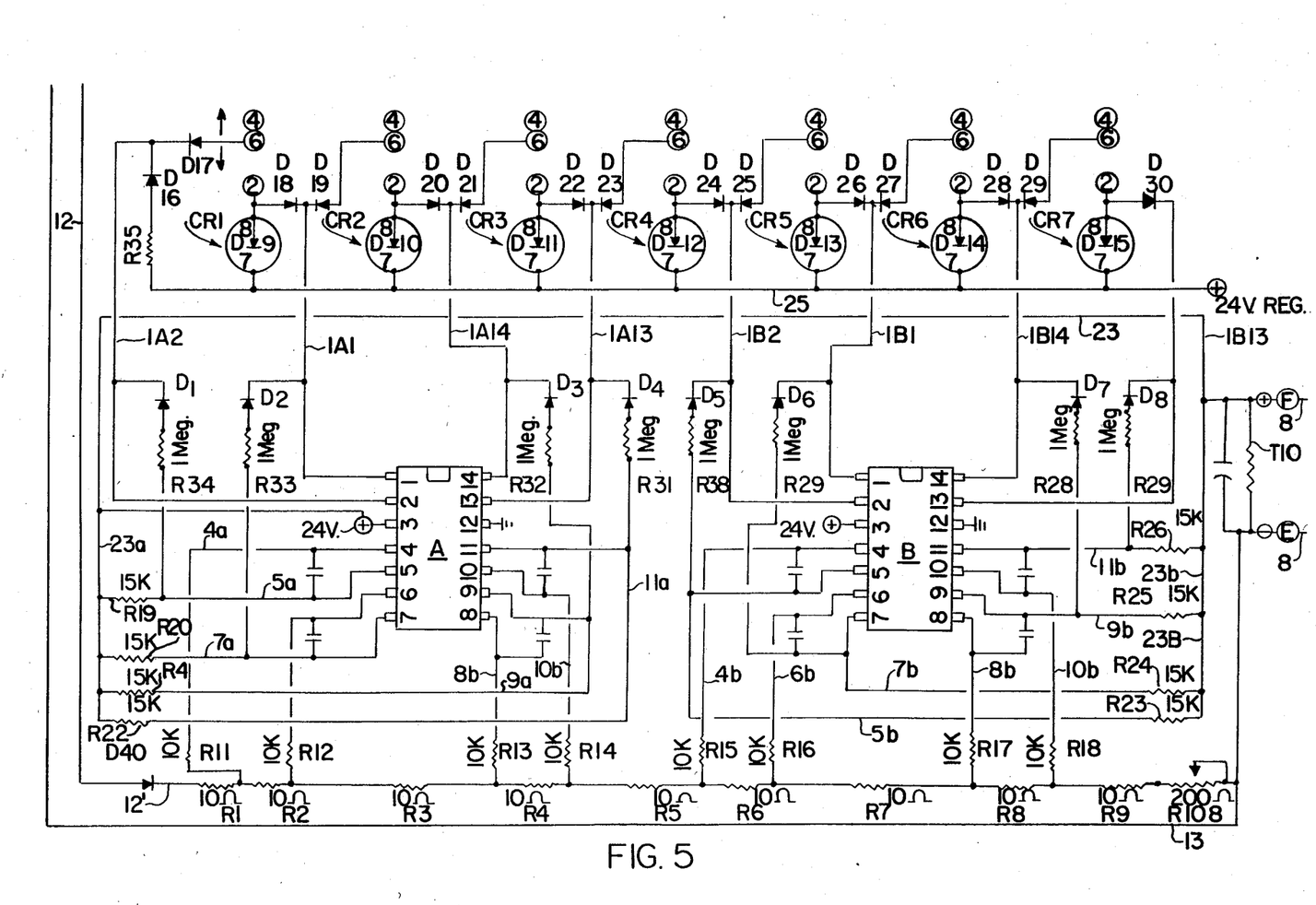
Figure 6:
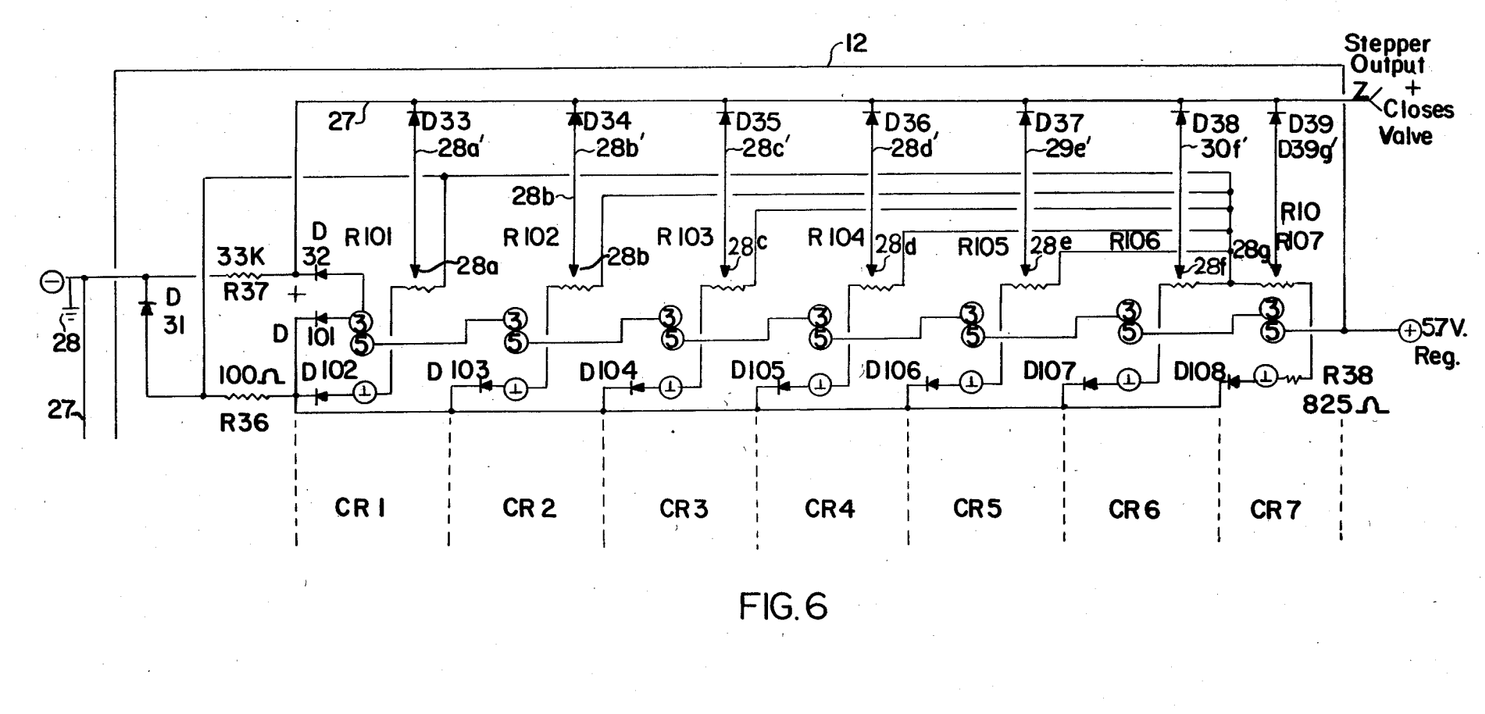

Reference is now made to FIGS. 4, 5 and 6 which schematically disclose a programmable valve positioner which, according to our invention, is included between the transducer and the servo amplifier. In FIGS. 4 and 5, the terminal F connects with the positive electric signal output from the transducer and E is the negative terminal of the transducer output. An explanation of the results accomplished by the programmable valve positioner is perhaps in order before explaining the valve positioner circuit itself.

This may be illustrated by reference to FIG. 3 in which the diagram represents graphically the span in the 40 meter tower between lines A—A and B—B of FIG. 1, line A—A representing the 39 meter level in a 40 meter tower with an air space, desirably one meter above the level of line A—A, and line B—B is at the 32 meter level, seven meters below line A—A. The system must assure that the water supply shall be completely shut off at the level of line A—A, but at line B—B and below this level, the supply valve should be fully open.

Figure 3:
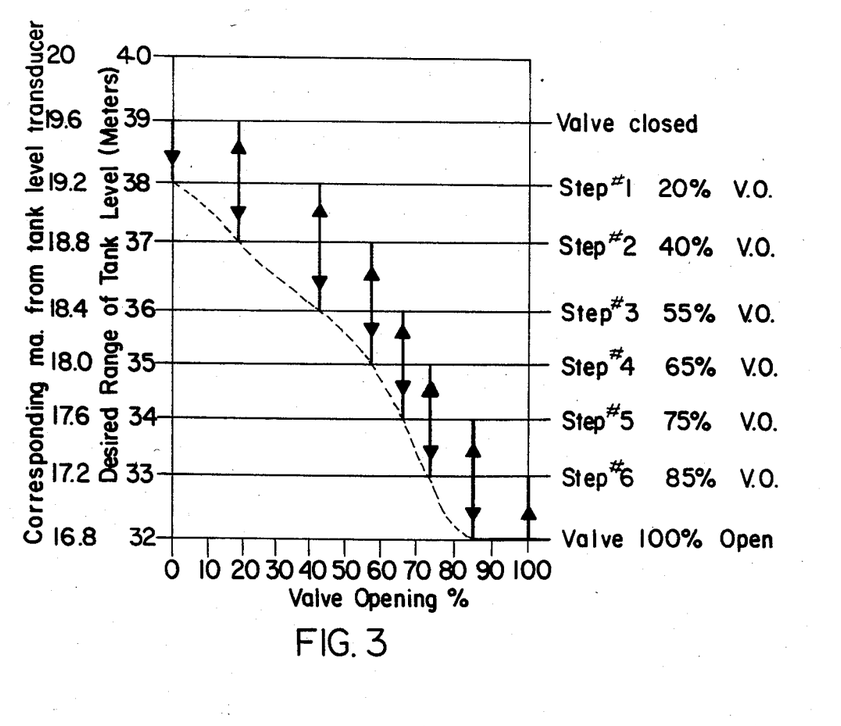
FIG. 3 is a diagram applicable to the performance of the invention as applied to, but not confined to, a typical water tower of 40 meters in height.

Between lines 39m in FIG. 3, corresponding to line A—A in FIG. 1, and lines 32m in FIG. 3, corresponding to lines B—B, FIG. 3 has equally spaced lines one meter apart which, reading upwardly, are indicated by the consecutive numerals at the left of the figure, from 33 to 38, thus representing seven spaces, in this case equal, of one meter between the 32 meter level and the 39 meter level.

In other words, in FIG. 3 above the line designated "32m", each line represents an increase in liquid level of one meter up to line 39 above which there must be no increase and the valve must remain closed.

Reading FIG. 3 in reverse, that is from level 39 downward, the water level may drop in the tank until it reaches the level of line 38 when the throttle valve will then open 20% and until the tank level rises to level 39 or drops to the level of line 37, which is practically a two-meter swing, the water level in the tank may rise or fall indefinitely with the transducer current almost "dancing" but there will be no change in the throttle valve setting. If the level eventually falls to the level of line 37, the throttle valve will open another 20%, and here again there is an overall lattitude of two meters, one above line 37 or one meter below line 37 where the level in the tank may rise or fall before any change in the throttle valve setting occurs. At level 32 the valve is fully open and stays fully open if the level is or remains below this level and until the depth rises one meter to the 33 meter level.

This accomplishes the primary purpose of the invention as applied to a water tower, which reduces the number of throttle valve adjustments over the now prevailing practice in the ratio of 100 to 1 in an average installation.

Projected to the left from the meter level numbers in FIG. 3 is a column of numerals indicating in milliamperes the changes in transducer signal output between one level and the next.

A second purpose of the invention is also indicated by this chart, FIG. 3, and this is the variation in the degree of change in the opening or closing of the valve to relate the degree of opening or closing of the valve at any step with relation to other steps to more nearly equalize the increase or decrease in the rate of flow between successive steps up or down. In FIG. 3, reading downward from the top level, the valve opens initially 20% of its full opening range, and at the second level it increases 20% more. At step number 3, the valve is open to an additional 15% to 55% and only 10% more in each of steps 4, 5, and 6; but from step 6 to the full open position, the valve opens 15 degrees from its former position, that is, from 85% open to fully open postion. This sequence follows in reverse order from fully open to the fully closed limit at 39 meters.

This is graphically illustrated in FIG. 3 by the spacing of the arrows crosswise of the diagram with reference to the scale of "valve opening %" at the bottom of the graph. Also, if a line is drawn, for example, connecting the lower ends of the downwardly pointed arrows, it will define a curve of downwardly increasing approach to vertical, as indicated by the dotted line so shown in FIG. 3. This illustrates that by varying the degree of valve opening or closing in one step, as compared to a previous or succeeding step, it is possible to secure an equal rate of change of flow from one step to another which cannot be secured by moving the valve in equal increments of distance or degrees with each step. It likewise enables a controlled graduated change in rate of flow such as to secure a slow rate of flow into the tower as the level rises, or selectively a uniform increase in rate of flow from step to step as the water level rises. This is what is meant by "programming the valve" so as to make each increment in rate of flow equal to every other increment instead of operating the valve as though each degree of change in the valve gave an equal increase or decrease in flow. This programming has particular importance when the demand for water is greatest to enable the average input to closely match the average outflow of water and thereby further decrease the frequency of opening and closing of the supply valve.

For dividing the practically continuously varying output voltage from the transducer into a total of eight separate stages, the entire circuit is disclosed in FIG. 4 and the enlarged complementary views, FIGS. 5 and 6.

The apparatus shown in these figures comprises two "off-the-shelf" IC chips, each of which is a quad comparator. Since these chips are commonly available in standard four-stage units, two of them are preferably used in place of a single eight-stage comparator. These quad comparators, in conjunction with resistors, relays and diodes, are all readily available commercial items and comprise the basic elements of FIGS. 4, 5 and 6.

In FIGS. 4 and 5 two quad comparators are designated A and B and each has four comparator circuits. Each circuit comprises a series of four reference voltage terminals, a series of four input voltage terminals and a series of four comparator output circuits. Taking the two comparators A and B together, there are eight comparator circuits. There is a vertical row of terminals numbered 1 to 7 down the left side of each comparator and 8 to 14 up the right side of each. The corresponding terminals of the respective comparators are herein designated by a reference number and letter, the numbers for comparator A being herein followed by the letter "a" and the numbers on comparator B are similarly followed by the letter "b", as for example "2a" and "2b", or the expression of the number and comparator being referred to is also used, as for example "output terminal 2 of comparator A" meaning the same thing as "2a".

As is usual with comparator circuits, one reference voltage terminal is paired with one input terminal and, as long as the input voltage is equal to or higher than the reference voltage on the terminal with which it is matched, there is no response in the comparator output circuit and no command is directed to the supply valve; but if the input voltage falls below the reference voltage, the output terminals of the comparator for that pair of terminals become energized or "go negative" so that the circuit connected with said output terminals is activated or "turned on".

It may also be noted here that when the water level in the tank is at the uppermost level and the supply valve is completely closed, the circuit for this stage is comparable to those in the succeeding stages since only when the liquid level falls one meter (in the assumed example) will anything be "turned on" other than diode 101 showing the tank to be full. The other seven paired comparator terminals and like circuits are provided for seven water level stages, 38 through 32.

Each of these seven comparator circuits controls a separate double pole-double throw (D.P.D.T.) relay to achieve the desired stepping action and to energize a separate light emitting diode (LED) in each relay circuit to show, at any time, which relay is actively functioning as the tank level rises or falls. As previously mentioned, relays have been used as being easily understood and explained, but the term is used throughout this specification and the claims not in a specific sense but in a generic sense to mean any switching device to control the transfer of a selected voltage from one conductor to another, suc as transistors or vacuum tube switches.

Looking at the comparators A and B in FIGS. 4 and 5, each has a row of terminals along the left side reading down from 1 to 7 and on the right side, reading upward, 8 to 14. Terminals 4, 6, 8 and 10 of each comparator are connected to a source of reference voltage. This reference voltage is derived from a regulated 5.7 volt current supplied to the terminal marked "+5.7 Reg." near the upper right corner of the complete diagram (FIG. 4) and at the right end of FIG. 6 and carried by conductor 12 to diode D40 (lower left corner of FIG. 5), thence to one end of a voltage divider comprising a conductor 12' along which are a series of resistors designated R1 to R9 with a potentiometer 108 or other voltage regulator leading to negative or ground connection 13 and the negative terminal E of the transducer input.

A reference voltage from the divider to terminal 4 of comparator A is through connection 4a and resistor R11 to the voltage divider between resistors R1 and R2. Another reference voltage is applied to terminal 6 of comparator A through connection 6a and resistor R12 connected to the voltage divider between R2 and R3. In like manner terminal 8 and 10 of comparator A are, respectively, connected through connector 8a and resistor R13 to the divider between resistors R3 and R4, and connector 10a from 10 and resistor R14 to the voltage divider between resistors R4 and R5. Terminal 4 of comparator B is correspondingly connected to the reference voltage divider between R5 and R6 through 4b and R15. Terminal 6 of comparator B is connected through 6b and resistor R16 to the divider between resistors R6 and R7. Terminals 8 and 10 of comparator B are similarly connected with the divider through their respective connectors 8b and 10b and resistors R17 and R18, respectively, at points between R7 and R8 and R8 and R9.

The voltage across the resistor R10 when the 4–20 milliampere current from the transducer is fed to terminals E and F is supplied through conductor 23 to each of two branches: 23a along the left side of the diagram as shown in FIGS. 5 and 6 and 23b at the right side. Branch 23a is connected to input terminals 5, 7, 9, and 11 of comparator A through connectors 5a, 7a, 9a and 11a, respectively; these connectors including resistors (reading downwardly) R19, R20, R21 and R22. Branch 23b is connected with corresponding input terminals 5, 7, 9 and 11 of comparator B through connectors 5b, 7b, 9b and 11b, respectively; these connectors include resistors R23, R24, R25 and R26. In this manner the input voltage derived from the transducer is applied equally to all the input terminals of the respective comparators A and B.

Briefly, the reference voltage applied to terminals 4, 6, 8 and 10 of each comparator through resistances R11 through R18 is derived from the voltage divider comprising conductor 12 and the nine resistors R1 through R9 connected in series with potentiometer R108. The input voltage is applied to terminals 5, 7, 9 and 11 through resistors R19 through R26 and is developed across resistor R10 at all times when the varying 4–20 milliampere signal from the transducer is applied to terminals E and F.

The output from the comparator A is through its terminals 2a, 1a, 14a and 13a, and from comparator B is through its corresponding terminals 2b, 1b, 14b, and 13b. As previously indicated, an output terminal becomes negatively energized when the input signal falls below the voltage of the reference signal or, in the parlance of the industry, the output terminal "goes negative" or "goes low".

In the preceding paragraph the sequence of the numbers is the order in which the output terminal of the comparators occurs. With the valve fully closed and in the diagram (FIG. 3), the level of the water in the tank falls from the full closed position at level 39 to the 38 meter level, but not before, output terminal 2 of comparator A will go negative, since the input signal from the transducer will lower from the transducer maximum voltage through the first stage of the voltage divider to input signal terminal 4 of comparator A while the reference voltage at terminal 3 remains constant and the comparator output voltage for terminals 3 and 4 in this instance is terminal 2. When terminal 2 of the comparator goes lower than or "goes negative" with respect to the reference voltage, there will then be a current flow from line 25 through diode D16 to line 1A2. This will also render diode D17 conductive but, since at this time swing arm 6 is an open circuit, there will be no current flow, as hereinafter explained. Following terminal 2, output terminal 1 will go negative if the water level in the tank drops another meter, on the scale diagrammed in FIG. 3, and a circuit will be energized from line 25 through relay CR1, diode 18 and output terminal 1 of comparator A. Terminals 14 and 13 of comparator A in like manner connect to relays CR2 through conductors 1A14 and 1A13, respectively. In like order, terminals 2, 1, 14 and 13 connect respectively to relays CR4, CR5, CR6 and CR7 through connectors 1B2, 1B1, 1B14, and 1B13.

Each of the switching devices in the series CR1 to 7, as here illustrated, is a D.P.D.T. (double pole-double throw). The one swing arm or armature of each relay has the terminal 6 movable between poles or contacts, 4 and 2 (FIG. 5). The other swing arm or armature of each relay is 5 (FIG. 6) that swings between poles 3 and 1 of each respective relay. The swing arms or armatures have the terminals 3 in series so that the opening of the 3 to 5 contacts of each successive relay to the right de-energizes the contact 3. The swing arm 5 of the last relay at the right end of the series is connected to the terminal, heretofore referred to, marked "+5.7 Reg." which, as explained, also supplies the reference voltage to the reference input terminals of comparators A and B.

In addition to energizing their respective relays as one after another they "turn on," each comparator through respective diodes D1 through D8 and, in reverse order, resistors R37 to R34, supplies a small feedback current to the respective comparator terminals 5, 7, 9 and 11 of each comparator. This feedback assures a positive "on" and "off" state of the respective relays CR1 through CR7.

Diodes D9 through D15 are connected, respectively, across the coils of each relay to prevent damage to the respective comparators from induced current developed when the coils of the relays, after having been energized, are de-energized. It may be here pointed out that diodes 101 to 108 are light emitting diodes (LEDs) and, with none of the relays energized, there is a current flow from swing arm 5 of CR1 through LED 101 and through resistor R36 which will pass only sufficient current to light one diode.

A line 27 is connected at one end into the circuit between diode 32 which is in series with pole or contact 3 of CR1 and resistor 37. Terminal Z of line 27 connects with the servo amplifier, the circuits being such that, with maximum voltage at terminal Z, the servo amplifier closes the valve 5 and, as voltage to Z decreases, the supply valve 5 opens wider.

Further explaining the operation of the circuit, when relay CR1 is energized, swing arm 5 is moved out of contact with its pole 3 and swings into circuit closing contact with pole 1, the contact between 3 and 5 is broken, LED 101 is extinguished, and the circuit through diode 32 to line 27 is opened. However, when contact 5 instantly moves from contact 3 to contact 1 with energizing of the relay CR1, a current flow from 5 to 1 energizes LED 102 and simultaneously sends a current to resistor R101 which, with wiper 28a, comprises a potentiometer or equivalent voltage regulator that sends a reduced voltage signal through conductor 28a' and diode 33 to line 27. This causes a drop in voltage at terminal Z which is the output to the servo amplifier and this, in turn, commands the supply valve or throttle valve to open to a limited extent, depending on the adjustment of the potentiometer. This, according to FIG. 3, is a 20% opening of the throttle valve. However, for some other type of throttle valve, this percentage might be adjusted through the potentiometer R101 and wiper 28a to a different percentage.

Following this adjustment, no further adjustment can be effected until either the tank fills to the limit, a rise of one meter, or lowers one meter. If comparator terminal 14 of A is turned on or goes negative, reflecting a further lowering of the water level in the tank from the 38 meter level in the tank, the next relay CR2 is energized. This causes swing arm 5 of the second relay to move away from contact 3 of this second relay and close a circuit with pole 1 thereof, thereby passing current through LED 103; but with the circuit to contact 3 of relay 1 being opened when armature 5 of the second relay separates from its contact 3, LED 102 is at the same time de-energized. A current from the 5.7 regulated volt supply also flows through contact 1 of CR2 to potentiometer resistor R102 and an adjusted reduced voltage flows to the potentiometer wiper 28b and diode 34 to line 27, reducing the voltage at Z to signal the servo amplifier to command a further opening of the throttle valve, the extent of which is determined by the adjustment of potentiometer R102. At the same time diodes 32 and 33, respectively (as do all of the diodes in the series 33 through 39), prevent any backflow of current from line 27 through any of the potentiometers at this time. With continuing decrease in water level in the tank, successive relays in the series operate until relay CR7 at the right end of the series in FIG. 6 is reached and the final signal for full opening of the throttle valve is sent through the respective potentiometer resistors R107 to terminal Z. As each switch closes, LEDs 104 to 108 are successively lighted while the preceding one is extinguished. As each change of potential is made, up or down, the potential at terminal Z holds steady until the next adjustment is made. In other words, there are not merely impulses sent to terminal Z, but there is adjusted sustained potential at each level until the next change is directed.

As before explained, comparator terminal 2A energizes resistor 35 and, from this point on, the sequence is as follows:

Terminal 1a activates relay CR1
Terminal 14a activates relay CR2
Terminal 13a activates relay CR3
Terminal 2b activates relay CR4
Terminal 1b activates relay CR5
Terminal 14b activates relay CR6
Terminal 13b activates relay CR7

No relay can be activated out of this sequence or deactivated except in the reverse sequence.

At any time, of course, the level in the tank may reverse and rise toward the top. In this case the sequence is reversed—each relay being de-energized in succession with the lighting of the LEDs 101 to 108, proceeding from the one last lighted to the preceding one.

However, there is an important difference in the reverse sequence. Recalling that in the valve opening sequence, CR1 to CR7, relay CR1 could not be energized until terminal 2 of comparator A went negative, relay CR2 could not be energized or remain energized unless CR1 was energized, and at the end of this sequence, CR7 could be energized only after CR6 was energized. In the reverse sequence, that is, going from fully open relay CR7 to CR6, etc., the relay CR7 may not be de-energized until the comparator circuit of relay CR6 is also de-energized, and CR6 may not be de-energized until the comparator circuit of relay CR5 is deenergized, and so on down to the level when CR1 is reached, and that relay may not be de-energized until terminal 2 of comparator A goes positive and removes the negative voltage across diode D16.

From this, it becomes apparent that on the valve opening sequence when comparator output terminal 2 of comparator A goes negative, CR1 may operate when its comparator output terminal number 1 of A goes negative. Reaching the upper end of the sequence terminal 1 of comparator B going negative activates CR5, terminal 14 of comparator B going negative will then close CR6, and terminal 13 of comparator B going negative energizes CR7.

On the descending or valve closing sequence, the swing arm of relay CR7 is at that time pulled down and is then in circuit with pole 2 of this relay. There is at this time a circuit from positive line 25 through the magnet coil of CR7 and comparator terminal 13 of comparator B through diode D30. When this comparator terminal 13 goes positive, current may not flow in the reverse direction through D30 but there will remain a closed circuit from relay pole 2 through swing arm 6 and diode 29 to negatively charged terminal 14 of comparator B, which is then being energized by a current flow from line 25 through diode D28 (corresponding in function to D30 of relay CR7). When, however, the water level in the tank has risen one meter from the full open level, comparator terminal 14 will go positive, breaking the circuit through diode D29 and relay CR7 will then open. However, CR6 will remain closed in a similar manner until terminal 1 of the comparator B goes positive.

In like manner, as the tank level rises each meter, the relay circuit will be opened only when the comparator terminal of the preceding relay has been de-energized. Reaching the first relay CR1 on the descending scale, it will not open until terminal 2 of comparator A goes positive, at which time the tank will be at the 39 meter (full) level. The cycle may, of course, reverse at any stage in the sequence with the up and down fluctuation in the level of water in the tank.

Thus, on the down scale, that is, "down" in reference to the relay numbers CR7 to CR1 in the reverse order, with each preceding relay being de-energized as the water level rises until the full stage is reached.

Most of the time, the rate of input and outflow may fluctuate in what may be termed an "average range" infrequently reaching the "full" or top level or the lower level but the input and outflow become closely matched so that ordinarily extreme fluctuations over the entire range will not be encountered, but the "average" level may from time to time move up and down in the selected tank range.

The intermittant or stepped signals from the valve positioner entail only slight modification of the servo amplifier which transmits the commands to the normally open (N/O) and normally closed (N/C) magnetically operated valves of the throttling valve (FIG. 2). This is diagrammatically disclosed in FIG. 7. In this figure, CRC is the relay for transmitting a closing command to N/O valve 5a of FIG. 2, and CRO is the relay for transmitting an opening command to the N/C valve 5k of FIG. 2 and, of course, controlling the return of these valves to their respective normally open and normally closed positions. The relays CRC and CRO as here diagrammed are single pole-double throw (S.P.D.T.) type relays. The terminals 1 and 2 in the diagram are connected to transmit closing signals from relay CRC to N/O valve 5h of FIG. 2 and terminals 3 and 4 transmit the opening signals from relay CRO to the N/C valve 5k of FIG. 2.

Figure 7:
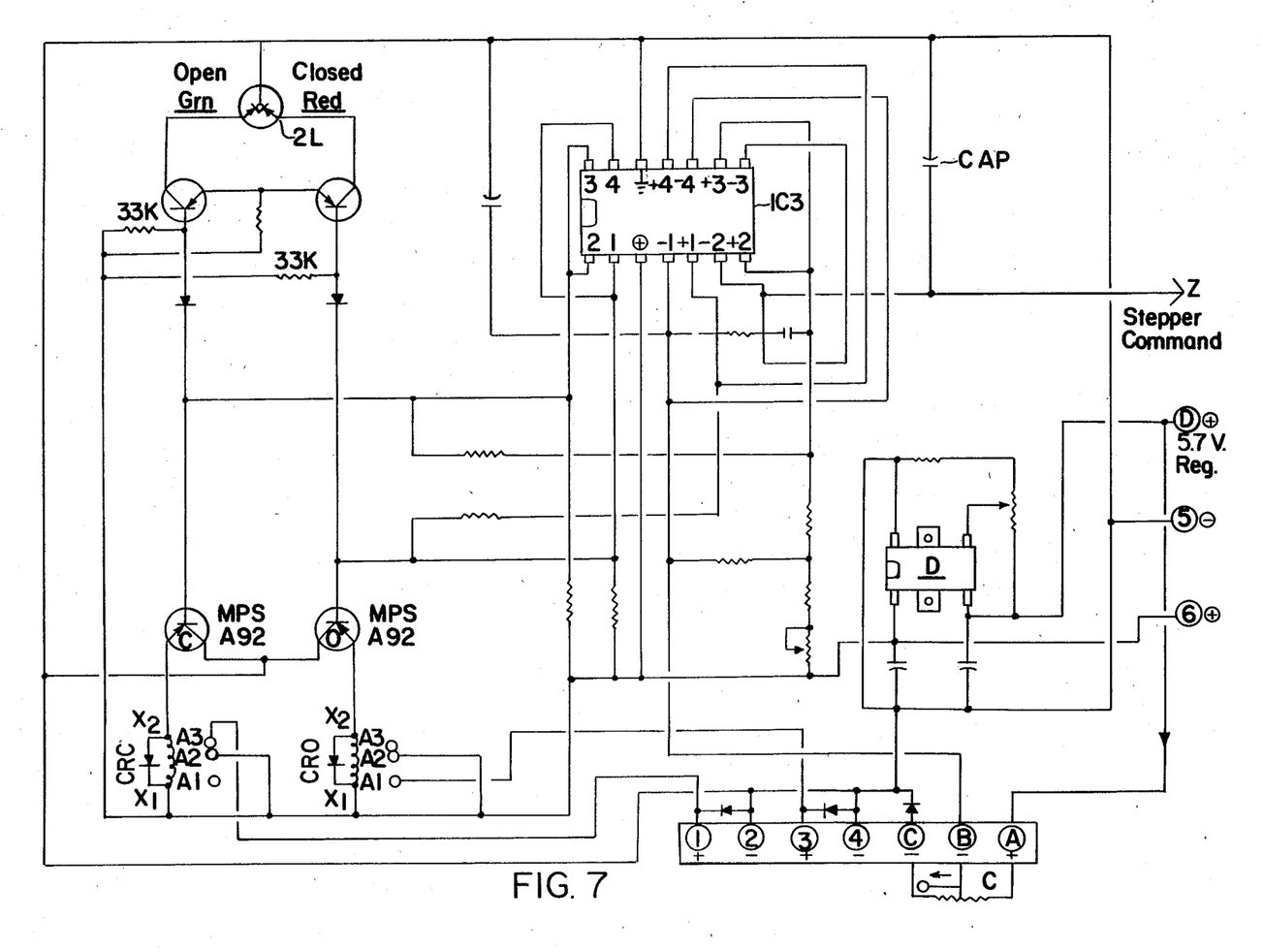
FIG. 7 is a schematic diagram of a well-known type of servo amplifier as slightly modified for the purposes of this invention.

As indicated above, servo amplifier 9 is basically of conventional design, using a quad comparator C to drive transistors to actuate the solenoid pilots on the throttling valve through relays CRC and CRO. Line Z in FIG. 7 is a continuation of line Z of FIG. 6.

As with present systems, the feedback from the feedback potentiometer FB operated by the supply valve will operate to close the valve and prevent overfilling of the tank.

There will necessarily be an instantaneous break in the circuit from the stepper to line Z at the moment a swing arm is moving from pole 2 of any relay to the opposite pole, as from 1 to 3 (FIG. 6), but the condenser CAP (FIG. 7) will retain a sufficient charge so that no momentary break in the continuity of any signal to line Z will be effective to change the servo amplifier.

The servo amplifier as here diagrammed also provides a two-color LED, here designated 2L, indicated as red and green, which is energized through parallel diode blocked circuits from relays CRC and CRO whereby the two-color LED shows red only when CRO is energized and shows green only when CRC is energized. Thus, visual signals are provided by LEDs 101 and 110 showing at which level "action" is taking place and 2L shows whether the level is rising or falling.

The invention in this instance provides a liquid level control circuit for water tanks, elevated tank reservoirs and other large containers subject to a more or less frequently changing level where, during a period of considerable withdrawal of liquid from the vessel, the rate of supply will automatically adjust to more or less match the rate of withdrawal, but at times of low withdrawal of liquid from the tank, keeps the tank full and which, at times of unusual demand for water or other liquid in storage, will then supply the water or other liquid through a fully open supply valve.

Figure 8:
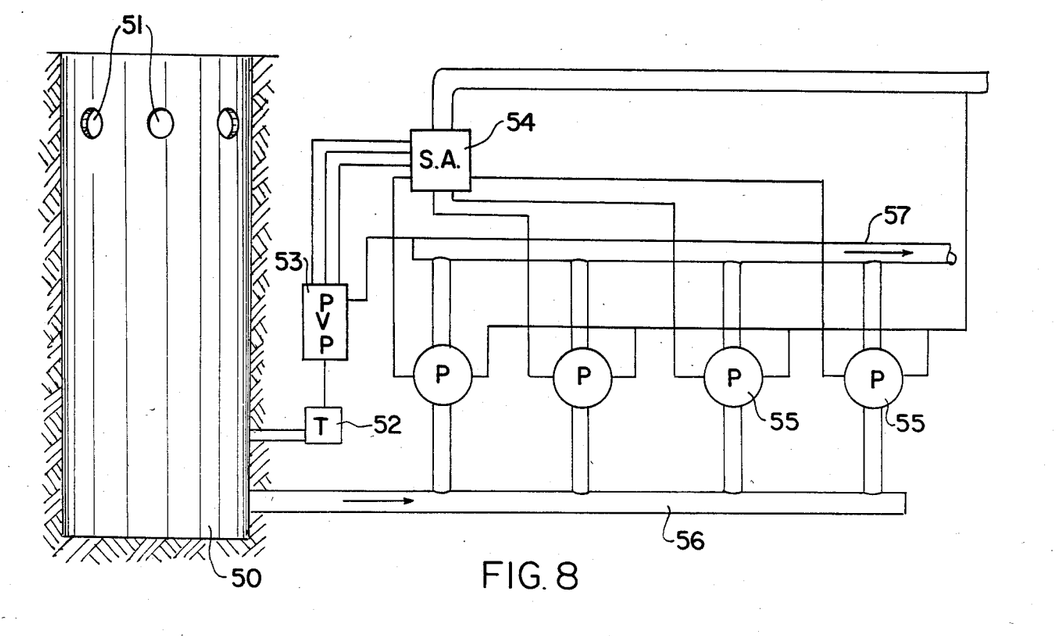
FIG. 8 is a schematic view of the invention as applied to the rise and fall of the liquid level in a so-called "wet well" in municipal sewage systems.

Referring to FIG. 8, which in a sense is the reverse of FIG. 1, more water is removed from the storage vessel as the level rises, whereas in FIG. 1 the water input slows as the level rises. In this figure, 50 designates a so-called "wet well" used in sewage disposal systems wherein wastewater, such as municipal waste, is supplied usually from a plurality of supply inlets 51, but in any case at a variable rate. During a large part of a 24-hour period the wastewater may be transferred through the wet well, where it is received at a rate to be easily transferred by a single pump of modest size to a disposal treatment plant. At other times, the sewage may be received at a rate where perhaps several modest size pumps are required. It is more economical from a power cost and investment cost standpoint to use more than one pump, and perhaps three or four, to take care of the variable rate of flow into the wet well. A transducer may be used to control the pump were it not for the irregular and fluctuating variations in liquid level of a magnitude to individually be unimportant but which could result in the unnecessarily frequent starting and stopping of pumps that such variations would entail. A succession of separate float response valves is, for this reason, presently required. As the liquid level in the well increases, an additional pump is energized. With the present invention using a transducer to generate a constant signal output with the comparator and relay circuit shown in FIGS. 4, 5 and 6, it becomes feasible to transform the continuously or almost continuously varying output signal current into a stepped out signal such as may bring into operation a pump at spaced intervals of depth—for example, one, or perhaps more realistically at a two-meter variation in level, which brings into operation another pump and may eliminate the operation of one pump with a decrease of one step or stage with a predetermined decrease of level of sewage in the wet well. In this case the servo amplifier opens and closes pump motor circuits, but unimportant fluctuations of level have no effect in the operation of the pump.

Figure 9:
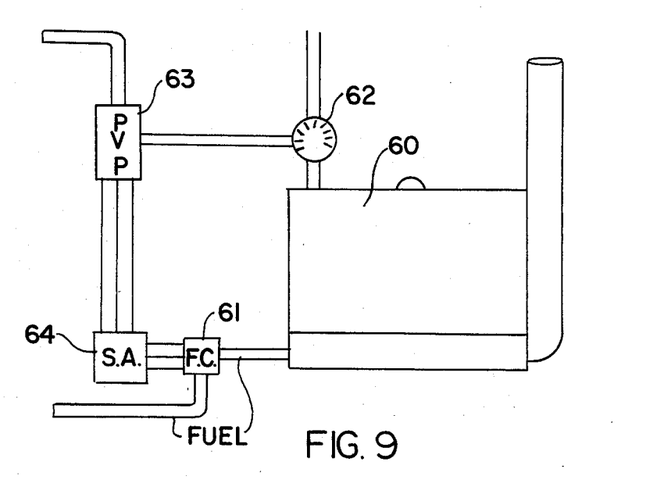
FIG. 9 is a schematic diagram of the transducer signal conversion system of the present invention as applied to a steam boiler and burner.

In FIG. 9 this second advantage of variable degrees of valve openings or closings may, however, be quite important. In this modification there is disclosed schematically a steam boiler 60 with an electrically operated fuel burner 61 of any preferred or well known construction. In most cases, the demand for steam is quite irregular and there may be many small changes in pressure up and down from an "average" selected pressure. In times of extremely heavy demand on the boiler, maximum heat over the control range may be required and, in time of no demand or low steam requirement, the burner may operate at the lowest level; but usually the fluctuation will vary to one side or the other of an intermediate or average level, as in the case of the water tower discussed earlier in this description. The continuous signal current from the transducer 62 which may be incorporated in the pressure gauge is transmitted to the programmable valve positioner 63 which, in turn, adjusts the burner in stages through servo amplifier 64 the same as it regulates the water inlet valve in FIG. 1. The valve positioner includes the comparator and relay circuits as disclosed in FIGS. 4, 5 and 6. This, in turn, controls the servo amplifier 64 connected with burner controller 61 to convert the output current from the transducer into a stepped or multiple stage continuous current and thereby eliminates minor unimportant fluctuations that occur between stages.

The same relay circuits and stepped signal output arrangement as disclosed in FIGS. 4–6 will be employed, if desired, with LED units as described in these figures and, of course, the pressure regulating potentiometer circuits for adjustably compensating for the variable effect of moving the burner valve at different stages in its operating range will be an important feature.

From the foregoing, it will be apparent how the transformation of a continuous current from a transducer or the like that responds either directly or indirectly to pressure level or temperature variations may be converted into a stepped output current from which minor fluctuations are eliminated to reduce unnecessarily frequent response in the transducer controlled apparatus.

In the following claims the term "potentiometer" is used in a generic sense to include such equivalent devices as voltage regulators, variable resistors and the like and "relays" is a generic term for various types of switches, vacuum tubes, transistors, etc., as well as magnetic type switches.

We claim:

1. In the combination comprising an apparatus, the operation of which is monitored by a transducer that responds to variations in a selected physical condition that occur within the apparatus and wherein the transducer modulates a constant electric current in response to variations in the selected condition that occur in the normal operation of said apparatus and wherein the modulated electric current so produced is transmitted to a servo amplifier which, in turn, controls the apparatus to keep overall variations in electric current within a selected range, the improvement wherein there is included between the transducer and the servo amplifier means to which the modulated current output of the transducer is transmitted which, in turn, nullifies the frequent and unimportant fluctuations in the modulated current from the transducer and transmits electric signals of definite stepped magnitude, up or down, to the servo amplifier whereby only voltage variations of significant importance to the functioning of the apparatus are reflected in the operation of the servo amplifier and unimportant variations are eliminated to thereby substantially reduce the frequency with which control signals from the servo amplifier to the apparatus which it controls are transmitted.

2. The improvement defined in claim 1 wherein the said means so introduced between the transducer and the servo amplifier comprises a multiple stage comparator having a sequence of input terminals to all of which the voltage modulated current from the transducer is connected, each of which terminals is paired with a terminal in a like sequence of reference voltage terminals, to each of which an electric current is supplied from a constant current source through a stepped voltage divider from which current of lowest voltage is supplied to the terminal at one end of the reference voltage sequence and the current supplied to each succeeding terminal in the sequence is a predetermined value of higher voltage, the comparator having an output terminal of each pair of input and reference voltage terminals, the comparator output for each terminal of the sequence being energized at all times that the output voltage from the transducer is negative with respect to its reference voltage, and a sequence of circuits, each one of which is connected to a comparator output terminal and is energized when the corresponding output terminal is energized, the energizing or de-energizing of which transmits a signal to the servo amplifier whereby the servo amplifier responds only to signals of distinctly separate predetermined magnitude notwithstanding the minor and sometimes frequent fluctuations of the transducer output voltage and responds always to the output signal last produced by the comparator.

3. The improvement defined in claim 2 wherein the several output signals from the comparator except the first include a succession of relays which successively transmit to the servo amplifier signals of greater or lesser magnitude than was produced by the previously energized relay.

4. The improvement defined in claim 2 in which the signal from the first output terminal of the series is effective to energize the circuits in which the relays are included but which does not itself transmit any signals to the servo amplifier.

5. The improvement defined in claim 4 in which the energizing of each relay and the de-energizing of each relay as the output signal from the comparator changes occur in sequence whereby, when any relay in the series after the first is energized, all of the previous ones will remain energized and, as the one last energized is de-energized, the preceding ones in the sequence remain energized.

6. The improvement defined in claim 5 in which the current of maximum voltage from the comparator to the servo amplifier is transmitted when no relay is energized and the energizing of each relay in sequence reduces the voltage of the current transmitted to the servo amplifier.

7. The improvement defined in claim 6 wherein the output circuits from the comparator may produce selectively unequal degrees of response at different stages in the sequence of circuits wherein impulses from the comparator may result in signals of selectively different magnitude to the servo amplifier at different stages in the sequence.

8. The improvement defined in claim 6 wherein the apparatus which is monitored by the transducer is a vessel for holding large amounts of liquid, and the fluctuations and changes monitored by the transducer are pressure changes due to variations in the depth of liquid in the vessel.

9. The improvement defined in claim 6 in which the apparatus comprises a water holding tower and the servo amplifier directs the throttling of a valve through which water from a source of water under pressure at a variable rate with an increased opening of the supply valve as the level in the tank falls to a decreasing and eventual closing as the level in the tank rises with a complete closing of the valve when a maximum depth limit is reached.

10. The improvement defined in claim 6 in which the apparatus comprises a boiler and the transducer responds to pressure variations in the boiler, and the servo amplifier directs the throttling of a valve in the fuel burner that fires the boiler.

11. The improvement defined in claim 7 in which the servo amplifier directs the operation of a throttling valve whereby the extent of opening or closing of the valve at each stage may be programmed to selectively vary the degree of opening or closing movement of the valve.

12. The improvement defined in claim 7 in which the servo amplifier directs the operation of a throttling valve whereby the extent of opening or closing the valve at each stage may be programmed to impart different degrees of movement at each stage and secure a more nearly uniform rate of increase or decrease of fluid through the valve from one stage to another than could be secured in the valve opened or closed to an equal extent at every stage.

13. The improvement defined in claim 7 wherein the apparatus which is monitored by the transducer is a water tower to which water is supplied from a pressure source through a valve and from which water is removed at variable rates to the area which the tower services and the transducer responds to variations in pressure in the liquid level in the tower as the demand for water increases or falls off and the servo amplifier directs the operation of said valve, the improvement comprising the inclusion between the transducer and the servo amplifier of means arranged to convert the fluctuating output signal from the transducer into a succession of separate direct current signals that increase or decrease in steps, the distance between which is of equal magnitude whereby the flow control valve is opened or closed only with a predetermined decrease or increase in the liquid level, thereby reducing the frequency of valve operation and enabling the rate of supply of water to the tower to more nearly conform to the rate of removal of water from the tower, said means so interposed between the transducer and the servo amplifier comprising a comparator to the input terminals of which signals from the transducer are supplied, each input terminal of the transducer being paired with one of a sequence of reference voltage terminals, each of which is connected to a predetermined higher voltage level from the preceding one, each pair of input and reference voltage terminals having an output terminal which is energized only when the input signal of a pair turns negative with respect to its reference voltage terminal, and a relay circuit energized by each of said output terminals except the first in the series, through the energizing of which only stepped signals of progressively increasing or decreasing magnitude are transmitted to the servo amplifier whereby fluctuations in levels of less than one step are not transmitted to the servo amplifier.

14. The improvement defined in claim 13 wherein the first relay may be energized only after the first output terminal of the comparator sequence has been previously energized and remains so, and such successive relay may only be energized and remain energized so long as the preceding relay in the sequence remains energized.

15. The improvement defined in claim 14 wherein each relay from the last to the second relay of the series may only be de-energized after the comparator has first opened the current flow from its terminals to the preceding relay in the series and the first relay of the sequence can only open when the comparator for the first output circuit has been de-energized.

16. The improvement defined in claim 13 wherein the first reference voltage directed to the servo amplifier is the highest in the sequence and the valve is then closed, and the reference voltage supplied to the remaining reference voltage terminals of the comparator terminals are sequentially successively lower in steps whereby the valve is fully open only when all of the reference voltage terminals are energized and the degree of closing of the valve with reference to one another also occurs in steps as the reference voltage terminals of the comparator are de-energized, the circuits and relays being so arranged that no relay can close until the preceding one in the sequence has first closed and no relay in the sequence can open until the comparator output for the next lower relay in the sequence has gone positive.

17. The improvement defined in claim 13 wherein there is a potentiometer in each relay output circuit which, in turn, connects to a common conductor that leads to the servo amplifier by which the degree of opening or closing of the supply valve at each opening or closing step of the supply valve may be adjusted with respect to one another.

18. The improvement defined in claim 1 in which the apparatus which is monitored by the transducer is a liquid receiving well into which liquid such as sewage is discharged at variable rates and a plurality of separate pumps are sequentially operated or stopped as the influx of liquid varies and wherein the transducer responds to all variations in liquid level in the well and wherein the servo amplifier directs the operation of the pumps in sequence, starting an additional one for each predetermined increment of increase in depth of liquid in the well and stopping it with each predetermined decrease in liquid level in the well, but eliminates the transmission of signals to the servo amplifier of up and down surges in liquid level less than one such increment.

19. In an apparatus wherein a transducer continuously monitors variations in the pressure of fluid contained in the apparatus and modulates a constant electric current to respond to substantially all pressure variations, large and small, and normally transmits the modulated current to a servo amplifier which, in turn, electrically regulates means for keeping the extent of variation between high and low limits, the improvement wherein a multistage comparator is included between the transducer and the servo amplifier, said comparator controlled means being so arranged as to continuously receive the modulated output from the transducer but transmits voltages of stepped predetermined potential to the servo amplifier to eliminate minor and unimportant fluctuations in pressure levels from being transmitted to the servo amplifier.

20. The apparatus defined in claim 19 wherein the means for regulating the pressure condition to which the transducer responds is a throttle valve.

21. The apparatus defined in claim 19 in which there is disposed between each of the comparator output terminals, except the first in the sequence, and the servo amplifier a relay circuit including a potentiometer whereby the degree of response of the throttle valve to the signal from the servo amplifier may be adjusted to give a greater or lesser degree of valve movement from a preceding or succeeding stage.

22. In an apparatus wherein a transducer monitors variations of depth in a liquid storage tank to control the opening and closing of a liquid supply to the tank, wherein the continuous response of the transducer generates a signal responsive to any measurable variation in liquid level in the tank, the improvement wherein the continuous signal from the transducer is converted into a stepped signal that controls the output signal from a servo amplifier to a flow control valve through a comparator and a sequence of relays that respond to an output signal from a comparator, each relay functioning to increase or decrease opening of the supply valve in predetermined measured steps to increase the opening of the flow control valve with a decrease in liquid level in the tank and decrease the opening of the valve in measured steps with a rise in liquid level with the supply valve fully open at a lower scale of equal steps and close the supply valve with the uppermost limit of the scale, wherein in one direction no relay may be energized unless the preceding relay in the sequence is at that time also energized through its comparator circuit and no relay can be de-energized unless its own comparator circuit and the comparator circuit for the next preceding relay in the scale has first been also de-energized whereby no valve adjustment may take place until there has been a rise or fall of one step on the scale of liquid in the tank level to which the transducer responds.

23. A stepper for use in converting a fluctuating signal from a transducer to steps of progressively increasing or decreasing magnitude with no interruption in the flow of current from the transducer comprising:

(a) a comparator having a sequence of signal input terminals to all of which the continuous input signal from the transducer is connected and each of which is paired with a sequence of like number of reference voltage terminals, each of which is connected with a positive source of constant direct current with each of said reference voltage terminals in the sequence being at a higher potential than the preceding one, the comparator having a sequence of output terminals with one for each pair of one input and one reference voltage terminal so related that each output terminal will be energized only when its input terminal becomes negatively charged with respect to its reference voltage which occurs only when its reference voltage falls below the transducer signal voltage on its comparator input terminal;

(b) an output circuit comprising a constant current voltage source across its terminals, and a servo amplifier controlled by said circuit, means for progressively decreasing or increasing the current flow from the output circuit to the servo amplifier as the terminals of the comparator are energized or de-energized, said last named means comprising a separate relay for each comparator terminal except the first;

(c) the first comparator output including a control circuit which is energized when said first comparator output terminal is energized;

(d) a succession of relay switches arranged to be operated in sequence as the remaining comparator output terminals after the first comparator output circuit have become energized one after another in rising or decreasing number as the transducer output current to the comparator terminals falls or rises, said relay switches as they close successively decreasing in steps the voltage to the servo amplifier and as they are de-energized and open increasing the voltage in steps to the servo amplifier, said relays being so interconnected that the first in the sequence cannot operate until said control circuit is first energized and each relay may not thereafter close until the preceding relay in the sequence has first closed nor may it open until the comparator output terminal for the preceding relay in the series has been de-energized and the first relay in the series may not open until said control circuit has been de-energized by its comparator output terminal again becoming positive due to a rise in the transducer output voltage increasing to its greatest potential.

24. The stepper defined in claim 23 in which there is an adjustable voltage regulated potentiometer for the output circuit of each relay switch into the servo amplifier control circuit.

* * * * *